Jan. 7, 1964

J. J. TANSEY 3,117,211

HOT WIRE CONTOUR CUTTING

Filed Jan. 3, 1961

INVENTOR.
JEROME J. TANSEY

BY

ATTORNEY.

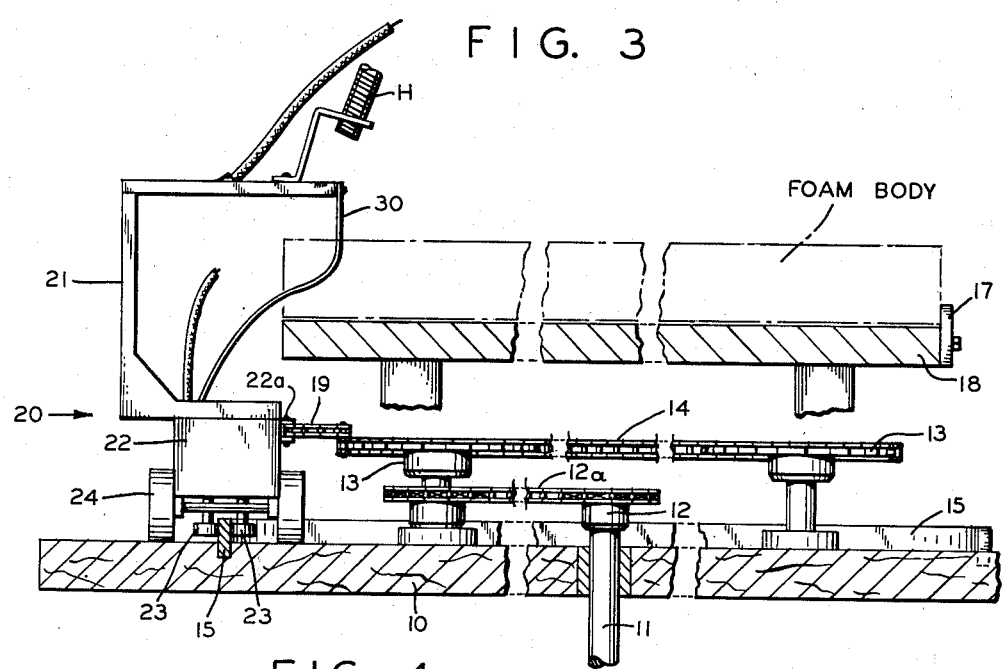
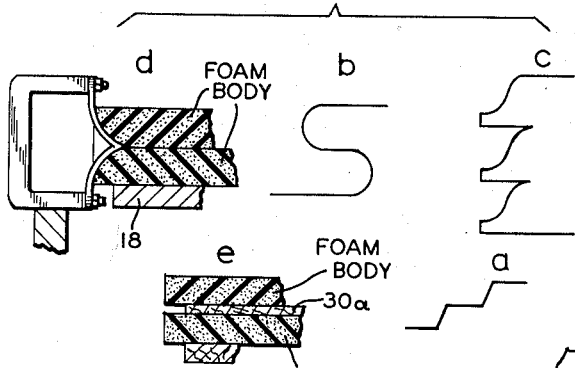
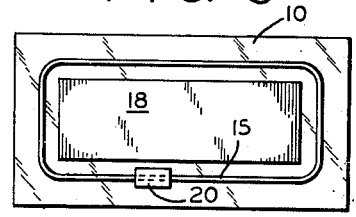
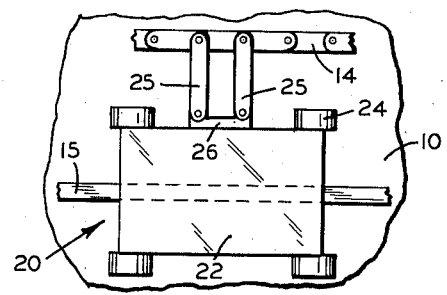
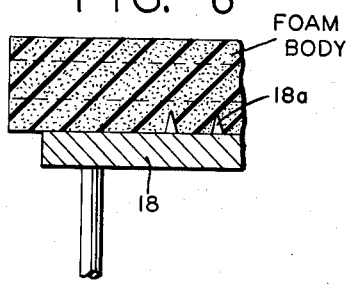

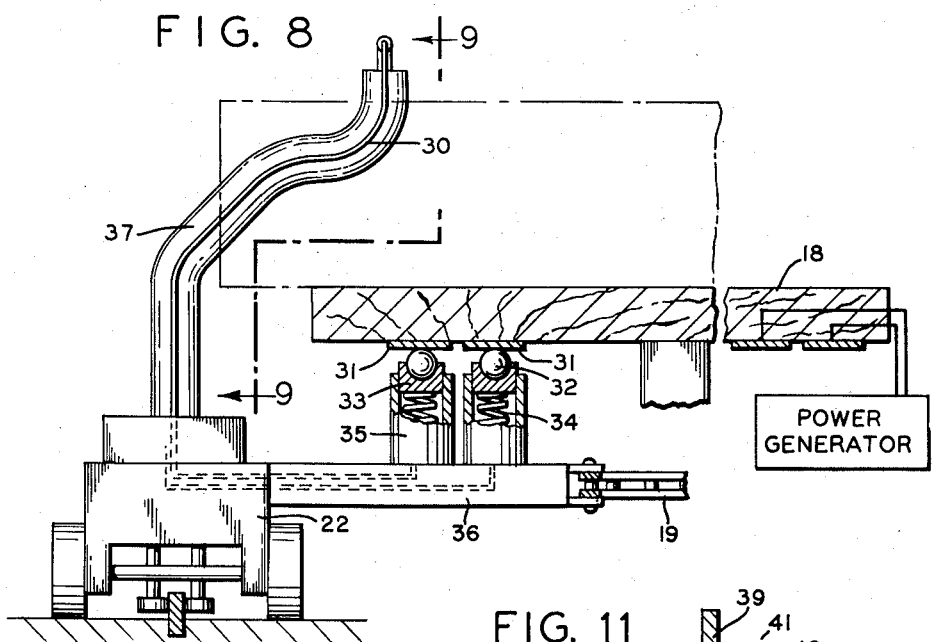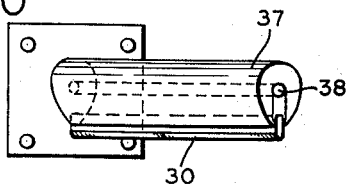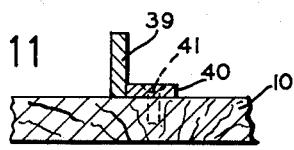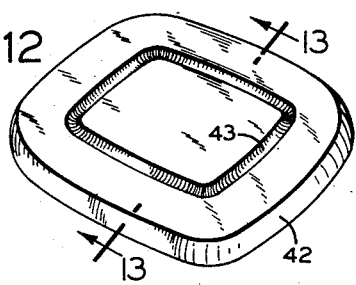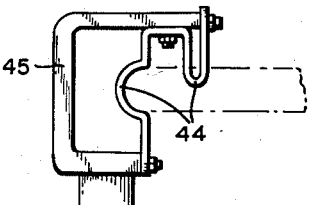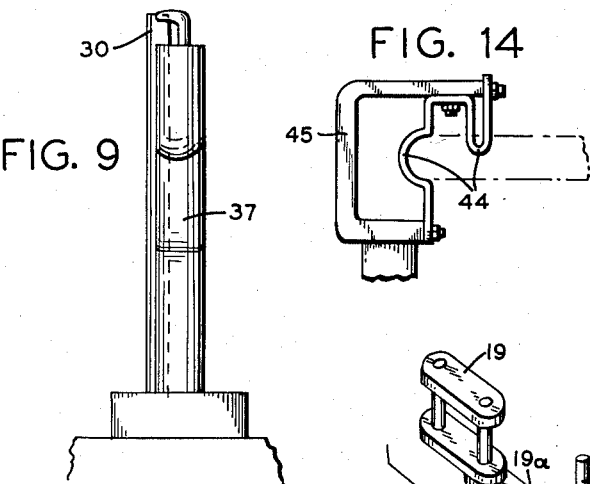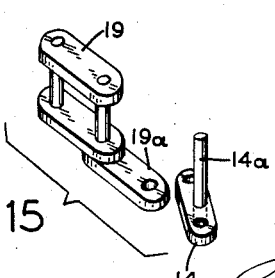

United States Patent Office 3,117,211
Patented Jan. 7, 1964

3,117,211
HOT WIRE CONTOUR CUTTING
Jerome J. Tansey, Sparta, N.J., assignor, by mesne assignments, to American Urethane, Incorporated, Franklin, N.J.
Filed Jan. 3, 1961, Ser. No. 80,463
15 Claims. (Cl. 219—19)

This invention relates to apparatus for contouring material such as foamed polyurethane, polystyrene and other thermoplastics.

The apparatus disclosed herein is particularly useful in contouring synthetic foam material utilized in furniture, automobile and aircraft cushions and topper pads, life preservers and other objects in which the pad is to be contoured to a given, often complex, geometric shape.

Foam material objects can be made in molds which will result in a finished prdouct having a pre-determined contour. Pads, cushions, etc., so made, can often be used without any additional shaping operations. However, there are many disadvantages in molding foam objects since it is necessary to provide a mold for each contour to be made and the foam material must go through setting and curing stages while in the mold. Thus each cushion or pad must remain in the mold until it is sufficiently stabilized in dimension to be removed without danger of changing its size or shape.

While molds are expensive items generally they are disproportionately more so when they are large and intricate as in the case of molds for topper pads. Substantial volumes of products are necessary to warrant the expense for even a single mold. Even where very large quantities of products are assured, the mold investment may still be a serious problem. This problem is particularly acute where it can be assured that a single product will be produced for a relatively short time. Mattresses, for example, may be produced for years without a change in shape and size. On the other hand, automobile seat cushions change from year to year and may vary materially from one manufacturer's model to another. Therefore, in order to produce the required number of cushions for a single model for a single year, and deliver them on time, it would be necessary to make a very substantial investment in a large number of molds which may have to be discarded at the end of the model year. As a result, molded foam products are very expensive and are therefore not widely used.

Foamed objects can also be made from foam materials produced in the form of long foam mats which may be molded but are preferably made by continuous processes. The cured slabs or mats are then cut into smaller sizes which approximate the dimensions of a finished product. The cut slabs are thereafter finished to the desired shape and size. Finishing operations may be accomplished in press type cutting machines, band saw type cutting machines or hot wire cutting machines and the edges and/or corners contoured by hand.

Hot wire cutting machines are particularly useful in cutting synthetic resin foam materials. Such machines utilize a heated Nichrome resistance wire, which may be straight or bent to a desired contour, and the slabs, supported on a movable platform, are fed in a straight line past the hot wire cutter. However, pads made on such machines require manual finishing at the corners when square corners are not desired. Hand held hot wire cutters may be used for such purposes as well as to make intricate cuts.

In each of the machines briefly described above some final finishing is required at the edge or corner of the pads produced whether it be sanding, cutting or buffing.

Accordingly, it is a principal object of this invention to provide a machine which will shape a foam mat or slab to substantially any finished contour in a single operation and thus eliminate sanding, buffing or other finishing operations whether by hand or machine.

Still another object is to provide apparatus for contouring a rough molded or otherwise formed foam pad quickly and to acceptable commercial tolerances in a single pass or cycle. Yet an additional object of the invention is to provide an apparatus which is readily adapted for contouring various shapes and sizes of finished products without expensive or numerous alterations. Yet a further object of the invention is to provide a machine which comprises relatively simple elements or parts which can be easily assembled. Still a further object is to provide a reliable machine which is capable of constant, continuous operation with relatively little danger of damage or improper operation. Further, the objects include providing a substantially automatic machine which only requires feeding and removal of finished units and is capable of being fed and discharged automatically. The machine itself can be started or stopped by means of known pushbutton control.

For purposes of illustration, the invention is described in connection with a presently preferred embodiment designed to contour automobile topper pads. Briefly, the invention comprises apparatus to drive and guide a hot wire cutter relative to a fixed pad of foam material whereby the periphery of the foam material is given a determined finished contour. To this end a table or platform supporting the foam pad defines a contouring station about which a hot wire cutter and supporting trolley are driven at a suitable cutting speed over a path defining a plan view of a finished pad. One of the advantages of the invention, in addition to those mentioned above, being that the hot wire cutter is bent to the contour shape desired so that the wire completes the contouring operation in a single pass, i.e., in one cycle of the machine.

The foregoing objects and advantages and additional advantages will be apparent from the following detailed description of a presently preferred embodiment of the invention particularly useful in contouring foam seat cushions or topper pads and wherein:

FIGURE 3 is a cross-sectional view of the apparatus taken along line 3—3 of FIGURE 2 and showing in detail the trolley vehicle and associated drive and a hot wire cutter.

FIGURES 4 a, b, c, d, e show some of the shapes to which a hot wire cutter can be bent to form finished contours for one or more pads stacked one upon another in one cycle of the cutter.

Figure 2:
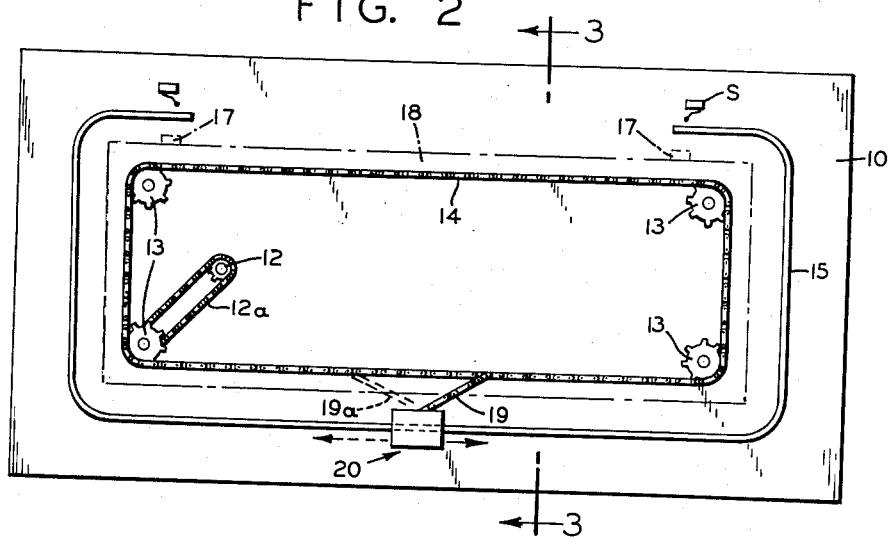
FIGURE 2 is a plan view, with some elements deleted, showing a preferred ararngement of the drive apparatus.

FIGURE 5 is a fragmentary plan view on a reduced scale showing a form of track which may be used in place of that shown in FIGURE 2.

Figure 1:
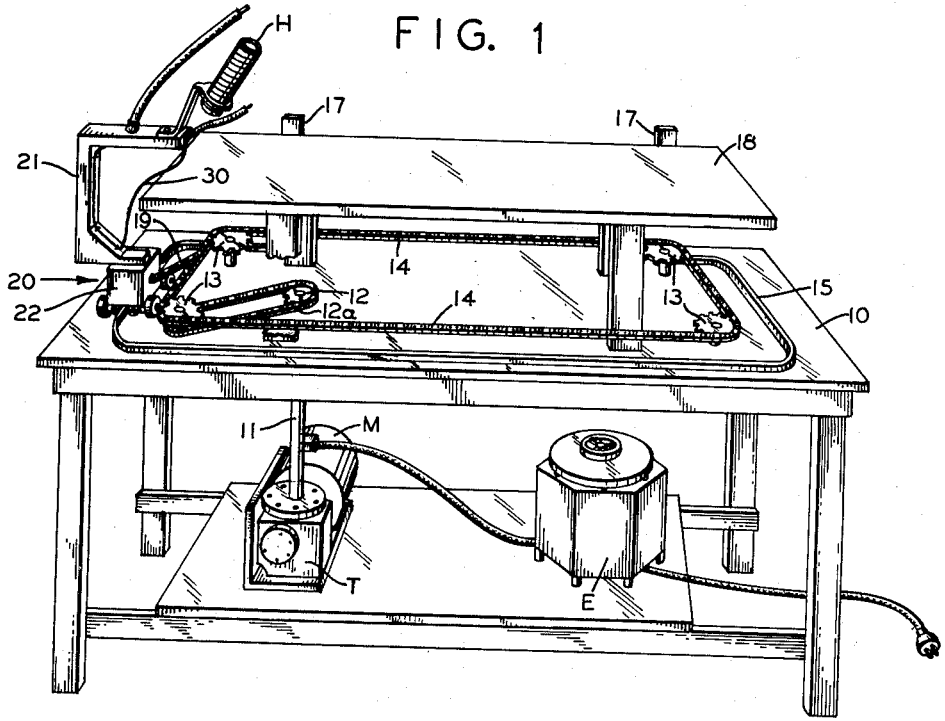
FIGURE 1 is a perspective elevation of a machine according to the invention.

FIGURE 6 is a fragmentary sectional view illustrating anothetr form of a platform which may be used instead of that shown in FIGURE 1.

FIGURE 7 is a fragmentary plan view illustrating an alternative connection between a trolley and a drive chain.

FIGURE 8 is a partial view of another embodiment of the invention.

FIGURE 9 is a side elevation of the hot wire assembly shown in FIGURE 8.

FIGURE 10 is a plan view of FIGURE 9.

FIGURE 11 is a fragmentary sectional elevation of another form of track.

FIGURE 12 is a perspective view of a contoured cushion in which all four sides are contoured and a central depression is also simultaneously formed.

FIGURE 13 is a cross-sectional view taken along line 13—13 of FIGURE 12.

FIGURE 14 is a fragmentary side elevation of a hot wire cutter of the type utilized in shaping the cushion or pad illustrated in FIGURES 12 and 13.

FIGURE 15 is a fragmentary exploded perspective view of a portion of the apparatus illustrated in FIGURES 1 and 2.

As seen in FIGURE 1, the invention comprises an extremely simple apparatus having a minimum of uncomplicated, economically manufactured parts without sacrificing durability and reliable operation. The apparatus comprises a platform 10 supported in a manner as shown, or in any other suitable manner. Beneath the platform 10 a motor M, including a gear train T and required electrical equipment E, is provided to drive the shaft 11 connected through the platform 10 with a driven chain sprocket 12. In turn, the sprocket 12 by means of a short coupling chain 12a drives one of the sprockets 13 over which a driven loop of chain 14 runs. Chain 14 is connected with a trolley generally designated 20 in a manner best seen in FIGURE 3 whereby the trolley 20 is driven at a suitable speed.

The trolley 20 is constrained to movement in a predetermined path defined by rail or steel rule track 15 removably secured to platform 10 in any known manner. Trolley bracket 21 removably secures one end of a Nichrome wire or ribbon, or other like high resistance material adapted to convert electric energy to heat. This element, either wire or ribbon, is herein referred to as a hot wire cutter 30. The other end of the hot wire cutter is likewise secured to the trolley body 22. The wire cutter 30 is insulated in known manner and a hose H may be provided to blow out ignited foam material.

A table 18, upon which is placed the foam material body to be sized and contoured, is supported, within the area generally defined by guide rail 15, in spaced parallel relation with the base or platform 10 as shown. Alternatively the shafts of chain sprockets 13 may be elongated to support table 18 as well as the separate legs illustrated. Table 18 may be provided with any suitable means to hold one, or a stack of foam material bodies to be sized and contoured against displacement. Sandpaper sheets (not shown) may be fixed to the top of table 12 for this purpose, however since the foam bodies seem to melt or disintegrate from the heat of the hot wire cutter 30 there is little if any displacing force created during the cutting operation.

On foam bodies to be sized and contoured by cutting only three sides thereof, one or more locating stops 17 are provided at one edge of table 18 to provide a reference plane to determine the width of the foam body to be cut. The length of such body is determined simply by placing it on the table 18 so that it overhangs the three sides of the table traversed by the adjacent hot wire cutter; the overhanging being great enough to allow engagement with the full contouring length of the hot wire cutter 30.

As best seen in FIGURE 2, the trolley 20 is alternately driven in a clockwise or counterclockwise direction about three sides of table 18 by a draw bar 19. In this instance, as best seen in FIGURE 3, the draw bar is in the form of a chain 19 pivotally attached to the trolley body 22 by an elongated link pin mounted in a suitable bracket 22a attached to the body 22 of the trolley. The other end of draw bar or chain 19 is removably pivotally attached to driving chain 14 (as illustrated in FIGURE 15) by an elongated pin 14a welded to one link of a pair of links of chain loop 14. The pin 14a and link 19a of the draw bar cooperating to form the attachment between these elements. Link 19a of course is readily slid on and off the pin 14a to facilitate assembly and disassembly of the trolley drive means.

The solid lines in FIGURE 2 show the position of draw chain 19 when pulling the trolley in a counterclockwise direction and the dotted lines, referred to as 19b, show the position of the draw chain when pulling the trolley in a counterclockwise direction.

A limit switch S is provided to reverse the direction of trolley 20 when it reaches the proximity of the ends of rail 15. Therefore, it will be apparent that the hot wire cutter, whether in the form of a wire or ribbon, should be capable of cutting a foam body from either its leading or trailing edge.

Referring to FIGURE 3, it will be seen that trolley 20, drawn by chain 19, is constrained to movement in the path of the rail 15 by a pair of followers or pinch bearing guides 23 engaging each side of rail 15 and attached to the underside of the trolley body 22. The trolley is movably supported and horizontally stabilized on the level platform 10 by wheels 24 connected to the trolley body 22 in known manner. It will be apparent that other suitable arrangements can be made; however only the presently preferred arrangement is illusrtated herein.

It will be apparent from FIGURE 3 that the hot wire cutter 30 secured to the trolley 20 is accurately maintained in a determined tracking path or sizing outline.

The hot wire cutter 30 may be made to any contouring configuration to shape one or more foam bodies as schematically indicated in FIGS. 4a, b, c, d and e. FIGS. 4a and b illustrate the intricate shapes to which cutter 30 may be bent to contour a foam body and FIG. 4c illustrates the shape the cutter wire may take in contouring a stack foam bodies held in position relative to one another upon the table 18.

FIG. 4d shows an arrangement for cutting or shaping a pair of foam bodies simultaneously with a single hot wire cutter.

In FIG. 4e a spacer 30a is utilized to facilitate contouring stacked pads with one pass of a hot wire. The space thus provided between the stacked pads or foam bodies affords a space within which the hot wire cutter can be bent back upon itself if necessary.

FIGURE 5 is a simplified plan view along the lines of FIGURE 2 showing an alternative arrangement wherein the trolley 20 is drawn continuously in the same direction about a closed track 15 in operative position relative to table 18 upon which a foam body is placed. This will provide contouring or shaping for all four sides of a foam body.

FIGURE 6 is a partial view of an alternative arrangement within the contemplation of the invention wherein a plurality of pins 18a secured to the table 18 are provided to secure one or more foam bodies, the dotted lines indicating the latter, upon the table 18 against displacement during the cutting operation.

FIGURE 7 illustrates an alternative arrangement wherein the drawn chain 19 illustrated in FIGS. 1–3 is replaced by parallel draw bars 25, pivotally connected with driving chain 14 and likewise connected to any suitable fitting 26 secured to the trolley body 22.

Electric energy may be supplied to the hot wire cutter in any suitable manner and as illustrated in FIGS. 1 and 3 the conductors connected with the cutter wire 30 may be suspended loosely above the machine. FIG. 8 illustrates an alternative arrangement wherein conducting strips 31 are arranged on the underside of table 18 in any known manner and having the same configuration as rail 15. A pair of roller contacts 32 mounted in a suitable known bearing piece 33 and urged against the strips 31 by a pair of springs 34. The contacts 32 and associated elements are housed in sleeves 35 secured on cantilevered arm 36 attached to the trolley body 22. The other end of the arm 36 may be connected to the draw chain 19.

The conducting strips 31 are connected electrically with a power generator and the current is conducted to the hot wire cutter 30 through the contacts 32 and associated parts described above. The hot wire cutter 30 and a copper conductor 38 connected thereto are embedded in a ceramic holder 37. The hot wire cutter is embedded in a slot in the leading edge of the holder 37 and protrudes therefrom to engage or heat a foam body.

The arrangement illustrated in FIGURE 8 is one suitable for use in the form of the invention illustrated in FIGURE 2. It being apparent that a like arrangement with cutting wires or ribbons protruding from both the leading and trailing edge of the holder 37 is also contemplated.

It will be seen by reference to FIGURES 8, 9 and 10 that the holder is therefore made to the shape of a contour to be cut and that the selected contour will be rigidly maintained by the hot wire cutter 30 embedded within the holder 37. It is noted also that the ceramic holder minimizes exposure of a foam body to be sized and contoured and thus the foam material may be cut with little or no scorching.

The electric circuit for driving motor M preferably includes conventional start, stop and reverse control means to facilitate speedy production. Suitable limit switches can also be placed as desired to limit travel of the trolley automatically.

FIGURE 11 shows a track 39 having lugs 40 attached thereto by welding or other suitable means. The track illustrated being readily attached to a platform by means of screws or similar means 41 passing through apertures in the lugs 40.

FIGURES 12 and 13 show a pad or foam body 42 which has been contoured on all four sides by use of the arrangement illustrated in FIGURE 5 wherein the track 15 is closed. FIGS 12 and 13 also show a depression 43 cut into the surface of the pad in the same operation whereby the periphery or all four sides of the pad is contoured. The depression 43 may be provided for decorative or other purposes.

FIGURE 14 illustrates a dual function hot wire cutter 44 and a holder 45 therefor which is suitable for use in producing a pad 42 of the form illustrated in FIGS. 12 and 13.

From the foregoing description it will be apparent that one or more foam pads may be automatically fed to the apparatus of this invention in any known manner and contoured by a hot wire cutter mounted on a guided trolley to automatically provide uniform contouring of a large number of pads. Further, a variety of pads may be shaped to different contours by changing the contoured wire cutter to any one of a number of shapes. Also, the platform mounting the rail 11 can be provided with a number of holes to allow the guide rail to be quickly changed to one conforming with the general outline of the pad of foam material to be contoured and if required the table 18 may also be made readily removable or replaceable for this purpose.

It will be apparent, therefore, that the invention described above can be adapted to a great number of contouring and sizing operations by those skilled in the art and that many modifications can be made or added to the apparatus above described. Therefore, the foregoing, given by way of example, is not intended to limit the scope of the invention as defined by the appended claims.

I claim:

1. Contouring and sizing apparatus for foam material comprising a planar platform, a table to support said material in parallel spaced relation with said platform, a guide rail secured to said platform spaced from and at least partly surrounding said table, trolley means operatively associated with said guide rail and supported by said platform in operative relation to the material supported on said table, means to move said trolley means along said rail, a hot wire cutter supported by said trolley means in operative relation to said table, and electric power means connected to said cutter.

2. Apparatus according to claim 1 wherein said hot wire cutter is bent to the shape of a contour to be made on said material.

3. Apparatus according to claim 2 with the addition of a ceramic holder shaped to the contour of said wire and having a slot in at least one edge thereof receiving said hot wire cutter.

4. Apparatus according to claim 1 wherein said trolley means comprises a body portion, a bracket supporting said hot wire cutter thereon, a plurality of stabilizing means attached to said body portion and engaging said platform to stabilize said trolley in a horizontal plane, follower means attached to said body portion and operatively associated with said guide rail to confine movement of said trolley over a path determined by said rail, a draw chain interconnecting said trolley with said means to move said trolley means along said rail.

5. Apparatus according to claim 1 wherein said trolley means comprises a body portion, a plurality of spaced wheels attached to said body portion and engaging said platform to stabilize said trolley in a horizontal plane, trolley guide wheels on each side of said guide rail to direct said trolley over a path determined by said rail, and a draw chain interconnecting said trolley with said means to move said trolley.

6. Apparatus according to claim 1 wherein said means to move said trolley is supported on said platform, the latter means comprising a plurality of chain sprockets, shaft means for said chain sprockets, a chain operatively interconnecting said sprockets, motor means associated with one of said sprockets to drive said chain, and a draw bar interconnecting said trolley to said chain.

7. Apparatus for contouring and sizing a body of foam material comprises a planar platform, a table in spaced parallel rotation above said platform adapted to support a body of foam material, a guide rail secured to said platform and spaced outwardly from and at least partly surrounding said table, a trolley movably supported on said platform, a hot wire cutter attached to said trolley and supported by a bracket attached to said trolley, follower means connecting said trolley to said rail whereby said trolley is confined to movement in a path defined by said rail and in operative relation with the body supported on said table, a closed chain within the area defined by said rail and in spaced parallel relation therewith, rotatable chain sprockets supported on said platform and operatively associated with said chain, draw bar means interconnecting said trolley and said chain, motor means operatively associated with said chain to impart movement thereto whereby said trolley is driven by said chain about said path and means for connecting said cutter to an electric power source.

8. Apparatus according to claim 7 wherein said follower means comprises a pinch bearing guide attached to said trolley and engaging each side of said rail.

9. Apparatus according to claim 7 wherein said guide rail surrounds only three sides of said table, said table having a plurality of positioning means to position said body on said table and limit switch means at each end of said rail to halt movement of said trolley.

10. Apparatus according to claim 7 wherein said draw bar means interconnecting said trolley and said chain comprises a draw chain pivotally connected to said trolley at one end and pivotally connected to said chain at the other end.

11. Apparatus according to claim 7 wherein said draw bar means interconnecting said trolley and said chain comprises parallel draw bars pivotally connected to said chain at one end and pivotally connected to said trolley at the other end.

12. Apparatus according to claim 7 wherein said means for connecting said hot wire cutter to an electric power source comprises a conducting strip secured on the underside of table and having the same configuration as said rail, movable contact members resiliently biased against said strips, electric conductors embedded in an arm supporting said contact members, said arm attached at one end to said trolley means and the other end of said arm pivotally attached to said trolley driving chain.

13. Apparatus according to claim 7 with the addition of means secured to the surface of said table engaging said body to prevent displacement of said body while being sized and contoured by said hot wire cutter.

14. Apparatus for contouring and sizing the periphery of a body of foam material comprising a table for supporting a slab of said material, a hot wire cutting means, said cutting means being positioned adjacent the edge of said table, means for connecting said cutting means to an electrical power source, said cutting means being vertically contoured to the shape of the contour to be provided along the part of the periphery of a slab to be cut by said cutting means, means mounting said cutting means for movement along a path determining the peripheral extent of the finished slab along said part of its periphery to cut said body and thereby provide the peripheral extent and contour along said part of its periphery, the latter means comprising a platform, a trolley movably supporting said cutting means on said platform, drive means connected to said trolley for driving it and said cutting means along said path, and guide means for guiding the movement of said trolley and said cutting means along said path.

15. Means for cutting a non-linear periphery on a body of foam material as well as for simultaneously contouring said periphery transversely of its length comprising a means for supporting the body of material, a planar platform, a trolley device, means movably supporting said trolley device on said platform for free movement over the latter, drive means for driving said trolley along said platform, a guide means connected to said platform and operatively connected to said trolley, said guide means serving to confine said trolley to a selected path of movement over said platform, cutting means connected to said trolley and carried thereby, said cutting means extending into relationship with said means for supporting said material to cut and contour a body of material supported thereon.

References Cited in the file of this patent

UNITED STATES PATENTS

| | | |
|---|---|---|
| 771,518 | Wilson | Oct. 4, 1904 |
| 1,954,061 | Smith | Apr. 10, 1934 |
| 1,978,042 | Dodge | Oct. 23, 1934 |
| 1,983,321 | Stephens et al. | Dec. 4, 1934 |
| 2,240,678 | Stanard | May 6, 1941 |
| 2,471,019 | Baker | May 24, 1949 |
| 2,623,149 | Amar | Dec. 23, 1952 |
| 2,655,960 | Murrey | Oct. 20, 1953 |
| 2,677,747 | Jaye | May 4, 1954 |
| 2,692,328 | Jaye | Oct. 19, 1954 |
| 2,903,545 | Heinrich | Sept. 8, 1959 |
| 3,018,355 | Wallerstein | Jan. 23, 1962 |

FOREIGN PATENTS

| | | |
|---|---|---|
| 548,727 | Italy | Sept. 29, 1956 |